United States Patent
Sir et al.

(10) Patent No.: US 6,855,194 B2
(45) Date of Patent: Feb. 15, 2005

(54) INK COMPOSITION CONTAINING MICRO-ENCAPSULATED UV ABSORBER AND PROCESS FOR PREPARING THE SAME

(75) Inventors: In-Shan Sir, Kaohsiung (TW); Chia-Hsin Chien, Taoyuan (TW); Yu-Chang Shen, Taipei (TW)

(73) Assignee: BENQ Corporation, Taoyuan (TW)

( * ) Notice: Subject to any disclaimer, the term of this patent is extended or adjusted under 35 U.S.C. 154(b) by 128 days.

(21) Appl. No.: 10/349,786

(22) Filed: Jan. 22, 2003

(65) Prior Publication Data

US 2003/0136300 A1 Jul. 24, 2003

(30) Foreign Application Priority Data

Jan. 23, 2002 (TW) ........................................ 91101064 A

(51) Int. Cl.⁷ .......................... C09D 11/00; C09D 11/02
(52) U.S. Cl. ................. 106/31.27; 106/31.33; 106/31.6; 106/31.65
(58) Field of Search ............ 106/31.27, 31.33, 106/31.6, 31.65

(56) References Cited

U.S. PATENT DOCUMENTS

| | | | |
|---|---|---|---|
| 5,401,060 A | * | 3/1995 | Chang et al. ............... 283/95 |
| 6,176,909 B1 | | 1/2001 | Malhotra et al. ........ 106/31.29 |
| 6,706,099 B2 | * | 3/2004 | Sir et al. ................. 106/31.02 |
| 6,716,526 B2 | * | 4/2004 | Weston et al. ........... 428/402.2 |
| 2002/0107304 A1 | * | 8/2002 | Leu et al. .................... 523/160 |
| 2003/0083200 A1 | * | 5/2003 | Serizawa et al. ........... 503/226 |
| 2003/0141491 A1 | * | 7/2003 | Sato et al. .................. 252/588 |
| 2003/0144376 A1 | * | 7/2003 | Vincent et al. ............. 523/160 |
| 2004/0038031 A1 | * | 2/2004 | Holbrey et al. ........ 428/402.24 |

FOREIGN PATENT DOCUMENTS

| | | | |
|---|---|---|---|
| JP | 01/170672 | * | 7/1989 |
| WO | 00/02965 | | 1/2000 |

OTHER PUBLICATIONS

Derwent abstract of JP01/170672; Jul. 1989.*

* cited by examiner

Primary Examiner—Helene Klemanski
(74) Attorney, Agent, or Firm—Ladas & Parry

(57) ABSTRACT

An ink composition containing a micro-encapsulated UV absorber. The ink composition includes a micro-encapsulated UV absorber, a dispersant, an emulsifer, at least one colorant, and a medium. The present invention adds a micro-encapsulated UV absorber to inkjet ink or screen printing ink. The micro-encapsulated UV absorber is suitable for either a water-based system or solvent-based system. The micro-encapsulated UV absorber increases the light-fastness and maintains longer-term light resistance because the UV absorber is gradually released from the microcapsule. The ink composition of the present invention provides excellent printing quality when used in inkjet or screen printing.

30 Claims, No Drawings

INK COMPOSITION CONTAINING MICRO-ENCAPSULATED UV ABSORBER AND PROCESS FOR PREPARING THE SAME

BACKGROUND OF THE INVENTION

1. Field of the Invention

The present invention relates to an ink composition, and more particularly to an ink composition containing a micro-encapsulated UV absorber and a process for preparing the ink composition.

2. Background of the Invention

Generally, eight kinds of ink are required for full color inkjet ink printing and screen printing, that is, magenta ink, cyan ink, yellow ink, black ink, red ink, blue ink, green ink, and orange ink. Most inkjet ink printing uses water-based colorant, and most screen printing uses organic solvent-based colorant. For environmental concerns, water-based colorant has been a trend in recent years. In addition, new inks including light magenta ink, light cyan ink, light yellow ink, orange ink, and green ink have been developed for use in inkjet printing in recent years. A water-based ink composition includes at least one water-based colorant, water, an organic solvent, and other additives. A solvent-based ink composition includes at least one solvent-based colorant, an organic solvent, and other additives. An inkjet ink composition mainly uses a water-based colorant. Since a water-based colorant has better miscibility with water, water-fastness is inferior. Consequently, the printed image exhibits inferior water and light resistance. Generally, a colorant with good water resistance and light resistance is chosen to improve the overall water-fastness and light-fastness of an ink.

Presently, it is important to achieve superior water resistance and light resistance in color inkjet ink preparation. Colorant can be classified into dye and pigment. Water-based dye ink generally has inferior water resistance and light resistance for printed images. Therefore, a large amount of pigment-based ink, which has good water resistance and light resistance, has been developed. A pigment-based ink includes at least one pigment, water, an organic solvent, and other additives. Pigment-based inkjet ink has better water resistance and light resistance for printed images than water-based dye ink. However, pigment-based ink has inferior color brightness compared to dye-based ink. Therefore, a suitable dispersant and adhesive must be added to pigment-based ink. Moreover, pigment has a larger particle size, which easily generates precipitation and coagulation. This plugs the inkjet nozzle and lowers the printing quality.

Colorant fades gradually because a photochemical reaction occurs when the colorant is irradiated by light. This photochemical reaction is induced by absorbed light energy, and can be classified into photolysis, photo-synthesis, and photo-sensitization. Conventional methods to improve light resistance attempt to enhance the dye's resistance to light. For example, an indigo series dye grafted with halogen ions has a better resistance to light than a dye without halogen. In U.S. Pat. No. 6,176,909, a water-based UV absorber is added to an ink to enhance the light resistance. A colorant with better light resistance will exhibit limited ink color saturation. If a UV absorber is directly added to an ink, since the photochemical reaction is irreversible, the UV absorber will react with light continuously until it is completely consumed Thus, the ink cannot attain higher light resistance.

SUMMARY OF THE INVENTION

The object of the present invention is to solve the above-mentioned problems and provide an ink composition with endured light resistance and a process for preparing the ink composition.

To achieve the above-mentioned object, the present invention adds a micro-encapsulated UV absorber to an ink, uses a dispersant to homogeneously disperse the micro-encapsulated UV absorber, and an emusifier to emulsify the UV absorber gradually released from the microcapsule. The ink composition can be used in inkjet printing or water- or solvent-type screen printing.

The ink composition of the present invention includes at least one colorant; an aqueous solution medium or organic solvent medium; a micro-encapsulated UV absorber homogeneously dispersed in the medium; a dispersant; and an emulsifier.

The process for preparing the ink composition of the present invention includes: providing a medium to serve as a solvent; adding a colorant to the medium, wherein the colorant provides at least one color; adding a dispersant to the medium; adding an emulsifier to the medium; and adding a microcapsule to the medium to form a microcapsule solution, wherein the microcapsule contains an UV absorber. The dispersant homogeneously disperses the microcapsule in the medium, and the emulsifier emulsifies the UV absorber gradually released from the microcapsule and homogeneously disperses the UV absorber in the medium.

According to a preferred embodiment of the present invention, the step of adding the microcapsule to the medium can be prior to the steps of adding the dispersant and the emulsifier to the medium

DETAILED DESCRIPTION OF THE INVENTION

Generally speaking, UV absorbers are oil soluble and not soluble in water. A surfactant is sometimes used to emulsify or dissolve the UV absorber in inkjet printing or water series screen printing. The oil-based UV absorber particles and the hydrophobic groups of surfactant form oil droplets in water emulsion. The present invention uses microcapsules to enclose a UV absorber, which is than homogeneously mixed with a dispersant and emulsifier. Different microcapsule walls and dispersing techniques can be used. Thus, the micro-encapsulated UV absorber of the present invention can he mixed with either water-based ink or solvent-based ink. By means of microcapsules, the UV absorber is gradually released, thus maintaining long-term light-fastness.

According to the present invention, the UV absorber is enclosed in the microcapsule and gradually released therefrom. The UV absorber, rather than the colorant, reacts with light by photochemical reaction. Thus, long-term light resistance is achieved. The so-called micro-encapsulation is such that a thin wall covers the surface of droplet of solid or liquid. The droplet can have a particle size of 1 to several thousand $\mu$m. The microcapsule can be present in the form of emulsion dispersion or powder according to product properties and usage. Generally, the inkjet nozzle has a diameter of about 30–50 $\mu$m. The micro-encapsulated UV absorber of the present invention preferably has a particle diameter less than 1 $\mu$m, for example, in the range of 0.001 to 1 $\mu$m, most preferably 0.01 to 0.5 $\mu$m. The presently used microcapsule wall is mainly made of synthetic polymer. Representative examples include urea-formaldehyde and melamine-formaldehyde resins, which have high density and good water resistance.

The present invention encloses the UV absorber with microcapsule and has the following advantages. (1) The UV absorber is isolated from the environment. This can decrease the consumption of UV absorber and maintain long-term light resistance. (2) The release rate of UV absorber can be controlled by means of microcapsule wall and porosity according to various uses. (3) By means of various micro-capsule walls and dispersion techniques, the micro-encapsulated UV absorber of the present invention can be used in water-based ink (such as inkjet printing or screen printing) and also in solvent-based ink (such as screen printing). Moreover, with the addition of micro-encapsulated UV absorber, the basic physical properties such as surface tension, pH value, and optical density of the original ink will not change.

The present invention provides two kinds of ink composition, water-based and solvent-based. The water-based ink includes an aqueous solution medium, a micro-encapsulated UV absorber, a dispersant, an emulsifier, a colorant, and other additives such as surfactants, organic solvents, pH buffer solutions, biocides, and preservatives. The solvent-based ink includes an organic solvent, a micro-encapsulated UV absorber, a dispersant, an emulsifer, a colorant, and other additives such as surfactants, organic solvents, pH buffer solutions, biocides, and preservatives.

According to the present invention, preferably, the water-based or solvent-based micro-encapsulated UV absorber is first dispersed with a dispersant. An emulsifier is then added to emulsify the UV absorber gradually released from the microcapsule and to homogeneously disperse the UV absorber in the water-based or solvent-based ink. Or, alternatively, the water-based or solvent-based micro-encapsulated UV absorber can be directly added to the ink formulation. When the ink is inkjet printed onto a recording medium (such as ordinary paper), the printed image has long-term light resistance.

The ink composition of the present invention includes is at least one pigment or dye to provide at least one color appearance. The colorant is present in an amount of 0.01–10 wt %, preferably 3–6 wt %, based on the total weight of the ink composition.

The UV absorber in the microcapsule suitable for use can be water-based such as TINUVIN 109 available from Ciba, TINUVIN 384-2 from Ciba, TINUVIN 2140 from Ciba, TINUVIN 5050 from Ciba, and TINUVIN 5151 from Ciba; or can be solvent-based such as TINUVIN 328 from Ciba, TINUVIN 384 from Ciba, TINUVIN 900 from Ciba, TINUVIN 928 from Ciba, TINUVIN 1130 from Ciba, TINUVIN 400 from Ciba, TINUVIN 123 from Ciba, TINUVIN 144 from Ciba, TINUVIN 292 from Ciba, TINUVIN 1405 from Ciba, TINUVIN 1930 from Ciba, UV-1 from SUNKO INK, UV-2 from SUNKO INK, UV-4 from SUNKO INK, LA-77 from ADEKA ARGUS CHEMICAL, LA-62 from ADEKA ARGUS CHEMICAL, and JF-77 from JOHOKU CHEMICAL. These water-based or oil-based UV absorbers are encapsulated and then added into a water-based or oil-based ink. The UV absorber is present in an amount of 0.01–20 wt %, preferably 0.05–10 wt %.

The emulsifier is present in an amount of 0.05–30 wt %, preferably 1–20 wt %. Emulsifier suitable for use can be A-102 from CYTEC, LF-4 from CYTEC, 1,3-BG from KYOWA, OG from KYOWA, BEPG from KYOWA, PD-9 from KYOWA, EP-810 from AIR PRODUCT, 2-propanol, di-1,2-propylene glycol, 2-pyrrolidone, N-methyl-2-pyrrolidone, 2,4,7,9-tetramethyl-5-decyne-4,7-diol, or 1,1,1-trimethylolpropane.

The dispersant is present in an amount of 0.05–30 wt %, preferably 1–20 wt %. Dispersant suitable for use in the present invention can be polyethandiol, polypropandiol, EO/PO copolymer, BO/EO copolymer, sodium dioctyl sulfonsuccinate, alkylene oxide adduct of acetylene glycol, polybutyl resin, cellulose derivative, styrene/acrylic copolymer, maleic acid/styrene copolymer, or a polymer containing both hydrophilic and hydrophobic segments.

The surfactant performs emulsification, dispersal, wetting, penetration, dissolution, foaming, defoaming, and detergency. Commercially available surfactants include CT-141 from AIR PRODUCT, CT-151 from AIR PRODUCT, OT-75 from CYTEC, GPG from CYTEC, and OT-70PG from CYTEC.

The ink composition of the present invention can further include a pH buffer solution. The colorant can create ideal colors only within a suitable pH range. pH buffer solution suitable for use can be diethanolamine, triethanolamine, hydroxides of alkali metal such as lithium hydroxide, sodium hydroxide, and potassium hydroxide, ammonium hydroxide, and carbonates of alkali metals such as lithium carbonate, sodium carbonate, and potassium carbonate.

The ink composition of the present invention can further include a chelating agent. The chelating agent prevents generation of crystalline salts This prevents coagulation of particles and plugging of the nozzle of the ink cartridge. Chelating agents suitable for use include sodium ethylenediaminetetraacetate, trisodium nitrilotriacetate, hydroxyethyl ethylenediamine trisodium acetate, diethylenetriamino pentasodium acetate, and uramil disodium acetate.

The ink composition of the present invention can further include an organic solvent to serve as the medium for the solvent-based system or as the additive for the water-based system. Suitable organic solvent can be cyclohexane, methanol, ethanol, ethylene glycol, diethylene glycol, triethylene glycol, polyethylene glycol, propylene glycol, butylene glycol, pentylene glycol, hexylene glycol, or polyhydric alcohols.

In addition, a biocide or preservative can be added to the ink composition of the present invention to inhibit the growth of microorganisms.

According to the present invention, there are two methods of preparing the ink containing micro-encapsulated UV absorber. The first method involves mixing all of the above-mentioned ingredients (including the micro-encapsulated UV absorber) to obtain the ink composition. The second method involves mixing all of the above-mentioned ingredients except the micro-encapsulated UV absorber to form an ink solution. The micro-encapsulated UV absorber is then added to the ink solution and stirred thoroughly. The mixing ratio of the microcapsule and the dispersant is in the range of 10:1 to 1:10, and the mixing ratio of the microcapsule and the emulsifier is in the range of 10:1 to 1:10.

The following examples are intended to illustrate the process and the advantages of the present invention more fully without limiting its scope, since numerous modifications and variations will be apparent to those skilled in the art.

Comparative Example 1

The following ingredients were mixed to form an inkjet ink composition.

5 wt % of Acid Red 92 available from Orient Chemical Industries, Ltd.

4 wt % of a humectant PEG 200 (polyethylene glycol 200) available from U.C.C.

4 wt % of a humectant 2-pyrrolidone available from DOW Chemical Company 4 wt % of a humectant 2-ethyl-2-(hydroxymethyl)-1,3-propanediol (EHMPD) available from Lancaster 0.5 wt % of a biocide SL-700 available from KYOWA deionized water The above magenta ink was printed onto commercially available inkjet coating paper with a commercially available inkjet printer. The printed paper was subjected to irradiation test for 16 hours and 32 hours, corresponding to three and a half month- and seven month-sunlight irradiation (10 hours sunlight irradiation per day). The color properties of printed paper before and after irradiation were compared. The spectrophotometer used was a commercially available simple irradiation machine.

Comparative Example 2

The following ingredients were mixed to form an inkjet ink composition.

5 wt % of a red water/oil amphiphilic colorant SR available from Kelly Chemical Corp.

4 wt % of a humectant PEG 200 (polyethylene glycol 200) available from U.C.C.

4 wt % of a humectant and solvent 2-pyrrolidone available from DOW Chemical Company 4 wt % of a humectant 2-ethyl-2-(hydroxymethyl)-1,3-propanediol (EHMPD) available from Lancaster 0.5 wt % of a biocide SL-700 available from KYOWA an organic solvent isopropanol The above magenta ink was printed onto commercially available arc paper for screen printing with a commercially available screen printer. The printed paper was subjected to irradiation test for 16 hours and 32 hours, corresponding to three and a half month- and seven month-sunlight irradiation. (10 hours sunlight irradiation per day). The color properties of printed paper before and after irradiation were compared. The spectrophotometer used was a commercially available simple irradiation machine Comparative Example 3

The following ingredients were mixed to form an inkjet ink composition.

2 wt % of a UV absorber TINUVIN 292 available from Ciba 5 wt % of Acid Red 92 available from Orient Chemical Industries, Ltd.

4 wt % of a humectant PEG 200 (polyethylene glycol 200) available from U.C.C.

4 wt % of a humectant and solvent 2-pyrrolidone available from DOW Chemical Company 4 wt % of a humectant 2-ethyl-2-(hydroxymethyl)-1,3-propanediol (EHMPD) available from Lancaster 3 wt % of a dispersant OT-75 available from KYOWA 0.5 wt % of a biocide SL-700 available from KYOWA deionized water The above magenta ink was printed onto commercially available ink jet coating paper and plain paper with a commercially available inkjet printer. The printed paper was subjected to irradiation test for 16 hours and 32 hours, corresponding to three and a half month- and seven month-sunlight irradiation (10 hours sunlight irradiation per day). The color properties of printed paper before and after irradiation were compared. The spectrophotometer used was a commercially available simple irradiation machine.

Comparative Example 4

The following ingredients were mixed to form an inkjet ink composition.

2 wt % of a UV absorber TINUVIN 292 available from Ciba 5 wt % of a red water/oil amphiphilic colorant SR available from Kelly Chemical Corp.

4 wt % of a humectant PEG 200 (polyethylene glycol 200) available from U.C.C.

4 wt % of a humectant and solvent 2-pyrrolidone available from DOW Chemical Company 4 wt % of a humectant 2-ethyl-2-(hydroxymethyl)-1,3-propanediol (EHMPD) available from Lancaster 3 wt % of a dispersant OT-75 available from KYOWA 0.5 wt % of a biocide SL-700 available from KYOWA an organic solvent isopropanol The above magenta ink was printed onto commercially available art paper for screen printing with a commercially available screen printer. The printed paper was subjected to irradiation test for 16 hours and 32 hours, corresponding to three and a halt month- and seven month-sunlight irradiation (10 hours sunlight irradiation per day). The color properties of printed paper before and after irradiation were compared. The spectrophotometer used was a commercially available simple irradiation machine.

EXAMPLE 1

This example provided an inkjet ink composition, which included the following ingredients.

2 wt % of a micro-encapsulated UV absorber (particle size was in the range of 0.01 to 1 $\mu$m)

5 wt % of Acid Red 92 available from Orient Chemical Industries, Ltd.

4 wt % of a humectant PEG 200 (polyethylene glycol 200) available from U.C.C.

4 wt % of a humectant and solvent 2-pyrrolidone available from DOW 4 wt % of a humectant 2-ethyl-2-(hydroxymethyl)-1,3-propanediol (EHMPD) available from Lancaster 3 wt % of a dispersant OT-75 available from KYOWA 5 wt % of an emulsifier XD-75 available from U.C.C.

0.5% of a biocide SL-700 available from KYOWA deionized water

The above ingredients (except the micro-encapsulated UV absorber) were stirred to form an ink solution. The micro-encapsulated UV absorber was then added to the ink solution and stirred thoroughly.

The above magenta ink (including micro-encapsulated UV absorber) was printed onto commercially available ink jet coating paper and plain paper with a commercially available inkjet printer. The printed paper was subjected to irradiation test for 16 hours and 32 hours, corresponding to three and a half month- and seven month-sunlight irradiation (10 hours sunlight irradiation per day). The color properties of printed paper before and after irradiation were compared. The spectrophotometer used was a commercially available simple irradiation machine.

EXAMPLE 2

This example provided an ink composition for screen printing, which included the following ingredients.

2 wt % of a micro-encapsulated UV absorber (particle size was in the range of 0.01 to 1 $\mu$m)

5 wt % of a red water/oil amphiphilic colorant SR available from Kelly Chemical Corp.

4 wt % of a humectant PEG 200 (polyethylene glycol 200) available from U.C.C.

4 wt % of a humectant and solvent 2-pyrrolidone available from DOW 4 wt % of a humectant 2-ethyl-2-(hydroxymethyl)-1,3-propanediol (EHMPD) available from Lancaster 3 wt % of a dispersant OT-75 available from KYOWA 5 wt % of an emulsifier XD-75 available from U.C.C.

0.5% of a biocide SL-700 available from KYOWA an organic solvent isopropanol

The above ingredients (except the micro-encapsulated UV absorber) were stirred to form an ink solution. The micro-encapsulated UV absorber was then added to the ink solution and stirred thoroughly.

The above magenta ink (including micro-encapsulated UV absorber) was printed onto commercially available art paper for screen printing with a commercially available screen printer. The printed paper was subjected to irradiation test for 16 hours and 32 hours, corresponding to three and a half month- and seven month-sunlight irradiation (10 hours sunlight irradiation per day). The color properties of printed paper before and after irradiation were compared. The spectrophotometer used was a commercially available simple irradiation machine.

The results of Comparative Examples 1–4 and Examples 1–2 are shown in Table 1. It can be seen from Table 1 that the ink composition of the present invention (including micro-encapsulated UV absorber) exhibits longer light resistance.

TABLE 1

|  | Inkjet printing | | | Screen printing | | |
| --- | --- | --- | --- | --- | --- | --- |
|  | Comp. Example 1 | Comp. Example 3 | Example 1 | Comp. Example 2 | Comp. Example 4 | Example 2 |
| After 16 hours irradiation | X | Δ | Δ | Δ | ○ | ○ |
| After 32 hours irradiation | X | X | Δ | Δ | Δ | ○ |

Note:
X: faded completely
Δ: faded at a great extent
○: faded a little

The foregoing description of the preferred embodiments of this invention has been presented for purposes of illustration and description. Obvious modifications or variations are possible in light of the above teaching. The embodiments chosen and described provide an excellent illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. An inkjet ink composition, comprising
at least one colorant;
an aqueous solution medium;
a micro-encapsulated UV absorber homogeneously dispersed in the aqueous solution medium;
a dispersant; and
an emulsifier.

2. The inkjet ink composition au claimed in claim 1, wherein the micro-encapsulated UV absorber has a particle size of 0.001 to 1 μm.

3. The inkjet ink composition as claimed in claim 2, wherein the micro-encapsulated UV absorber has a particle size of 0.01 to 0.5 μm.

4. The inkjet ink composition as claimed in claim 1, wherein the micro-encapsulated UV absorber is water-based.

5. The inkjet ink composition as claimed in claim 1, wherein the micro-encapsulated UV absorber is oil-based.

6. The inkjet ink composition as claimed in claim 1, wherein the micro-encapsulated UV absorber is present in an amount of 0.01 to 20 weight %.

7. The inkjet ink composition as claimed in claim 1, wherein the colorant is a dye or pigment present in an amount of 0.01 to 10 weight %.

8. The inkjet ink composition as claimed in claim 1, wherein the dispersant is present in an amount of 0.05 to 30 weight %.

9. The inkjet ink composition as claimed in claim 1, wherein the emulsifier is present in an amount of 0.05 to 30 weight %.

10. The inkjet ink composition as claimed in claim 1, wherein the medium further comprises at least one additive of organic solvent, surfactant, pH buffer solution, chelating agent, biocide, humectant, and preservative.

11. An ink composition for screen printing, comprising:
at least one colorant;
a medium;
a micro-encapsulated UV absorber homogeneously dispersed in the medium;
a dispersant; and
an emulsifier.

12. The ink composition as claimed in claim 11, wherein the medium is an aqueous solution or organic solvent.

13. The ink composition as claimed in claim 11, wherein the micro-encapsulated UV absorber has a particle size of 0.001 to 1 μm.

14. The ink composition as claimed in claim 13, wherein the micro-encapsulated UV absorber has a particle size of 0.01 to 0.5 μm.

15. The ink composition as claimed in claim 11, wherein the micro-encapsulated UV absorber is water-based.

16. The ink composition as claimed in claim 11, wherein the micro-encapsulated UV absorber is oil-based.

17. The ink composition as claimed in claim 11, wherein the micro-encapsulated UV absorber is present in an amount of 0.01 to 20 weight %.

18. The ink composition as claimed in claim 11, wherein the colorant is a dye or pigment present in an amount of 0.01 to 10 weight %.

19. The ink composition as claimed in claim 11, wherein the dispersant is present in an amount of 0.05 to 30 weight %.

20. The ink composition as claimed in claim 11, wherein the emulsifier is present in an amount of 0.05 to 30 weight %.

21. The ink composition as claimed in claim 11, wherein the medium further comprises at least one additive of organic solvent, surfactant, pH buffer solution, chelating agent, biocide, humectant, and preservative.

22. A process for preparing an ink composition, comprising the following steps of:

providing a medium to serve as a solvent;

adding a colorant to the medium, wherein the colorant provides at least one color;

adding a dispersant to the medium;

adding an emulsifier to the medium; and adding a microcapsule to the medium to form a microcapsule solution, wherein the microcapsule contains an UV absorber, wherein the dispersant homogeneously disperses the microcapsule in the medium, and the emulsifier emulsifies the UV absorber gradually released from the microcapsule and homogeneously disperses the UV absorber in the medium.

23. The process as claimed in claim 22, wherein the mixing ratio of the microcapsule and the dispersant is in the range of 10:1 to 1:10.

24. The process as claimed in claim 22, wherein the mixing ratio of the microcapsule and the emulsifier is in the range of 10:1 to 1:10.

25. The process as claimed in claim 22, wherein the micro-encapsulated UV absorber has a particle size of 0.001 to 1 $\mu$m.

26. The process as claimed in claim 25, wherein the micro-encapsulated UV absorber has a particle size of 0.01 to 0.5 $\mu$m.

27. The process as claimed in claim 22, wherein the micro-encapsulated UV absorber is water-based.

28. The process as claimed in claim 22, wherein the micro-encapsulated UV absorber is oil-based.

29. The process as claimed in claim 22, wherein the micro encapsulated UV absorber is present in an amount of 0.01 to 20 weight %.

30. The process as claimed in claim 22, wherein the step of adding the microcapsule to the medium is prior to the steps of adding the dispersant and the emulsifier to the medium.

* * * * *